(12) United States Patent
Togashi et al.

(10) Patent No.: US 7,061,747 B2
(45) Date of Patent: Jun. 13, 2006

(54) STACKED CAPACITOR

(75) Inventors: Masaaki Togashi, Yuri-gun (JP);
Tatsuya Fukunaga, Yuri-gun (JP)

(73) Assignee: TDK Corporation, Tokyo (JP)

( * ) Notice: Subject to any disclaimer, the term of this patent is extended or adjusted under 35 U.S.C. 154(b) by 11 days.

(21) Appl. No.: 11/157,799

(22) Filed: Jun. 22, 2005

(65) Prior Publication Data
US 2005/0286206 A1 Dec. 29, 2005

(30) Foreign Application Priority Data
Jun. 29, 2004 (JP) .............................. 2004-192041

(51) Int. Cl.
*H01G 4/228* (2006.01)
(52) U.S. Cl. .............................. 361/306.3; 361/301.2; 361/306.1; 361/306.2; 361/311; 361/313; 361/321.2
(58) Field of Classification Search ............. 361/306.3, 361/306.1–306, 301.2, 301.3, 301.4, 311–313, 361/321.1–321, 303, 305
See application file for complete search history.

(56) References Cited

U.S. PATENT DOCUMENTS 5,883,780 A * 3/1999 Noji et al. .................. 361/303
6,266,228 B1 * 7/2001 Naito et al. ............... 361/306.1
6,331,930 B1 * 12/2001 Kuroda et al. ........... 361/306.3
6,473,292 B1 * 10/2002 Yoshida et al. ........... 361/321.2
6,906,907 B1 * 6/2005 Prymak et al. ........... 361/306.3
6,914,767 B1 * 7/2005 Togashi et al. ............. 361/303

FOREIGN PATENT DOCUMENTS

| JP | A 2000-208361 | 7/2000 |
| JP | A 2001-185441 | 7/2001 |
| JP | A 2001-284171 | 10/2001 |

* cited by examiner

Primary Examiner—Nguyen T. Ha
(74) Attorney, Agent, or Firm—Oliff & Berridge, PLC

(57) ABSTRACT

A stacked capacitor includes a dielectric member, a plurality of internal electrodes, and a plurality of extraction electrodes. The dielectric member is a stacked member formed of stacked dielectric layers and having at least one side surface. The internal electrodes are stacked alternately with the dielectric layers and have first edges positioned near the side surface. Each of the extraction electrodes leads from each first edge to the side surface. Each of the extraction electrodes has a width W on the side surface in a direction orthogonal to the stacking direction and is separated from adjacent extraction electrodes by a distance G on the side surface in the direction orthogonal to the stacking direction. The width W and distance G are set such that $1.2 \leq W/G \leq 4.0$.

4 Claims, 5 Drawing Sheets

W/G < 1.2

W/G ≧ 1.2

STACKED CAPACITOR

BACKGROUND OF THE INVENTION

1. Field of the Invention

The present invention relates to a stacked capacitor capable of reducing equivalent series inductance (ESL).

2. Description of Related Art

In recent years, power sources have supplied lower voltages to central processing units (CPUs) provided in digital electronic equipment in order to reduce power consumption. On the other hand, as the operating frequency of today's CPUs continue to increase, it has become necessary to supply larger load currents to the CPU.

When current flows the wire in the CPU, voltage drop is caused by inductance of the wire. If the load current changes abruptly, larger voltage drop is caused. If the power source applies a low voltage to the CPU, it is impossible to ignore the voltage drop since slight changes in the voltage can lead to CPU's malfunctions. Therefore, the importance of stabilizing the voltage increases.

A stacked capacitor called a decoupling capacitor is connected to the power source in the CPU for stabilizing the power source. When rapid transient changes in the load current occur, current is supplied to the CPU from the stacked capacitor through rapid charging and discharging of the capacitor, thereby suppressing voltage changes in the power supply.

However, the decoupling capacitor has an equivalent series inductance (ESL). The voltage change $\Delta V$ is expressed by $\Delta V = ESL \times di/dt$ (the di/dt expresses the change in current). On the other hand, as the operating frequency in today's CPUs continues to improve, the change in current di/dt is larger and occurs more rapidly. Therefore, the ESL of the decoupling capacitor itself greatly affects voltage changes since the change in current di/dt is large. Since voltage change in the power source can be suppressed by reducing this ESL, various forms of stacked capacitors capable of reducing ESL have been proposed.

Generally a stacked capacitor is constructed of a dielectric member having sheet-like dielectric layers stacked alternately with internal electrodes having a surface area smaller than that of the dielectric layers. An extraction electrode leads from the internal electrode to the outer surface of the dielectric member. When current is supplied to the internal electrodes through the extraction electrodes, the ESL is generated by the current flowing through the internal electrodes.

In a conventional stacked capacitor disclosed in Japanese patent application publication No. 2000-208361, for example, the paths through which current flows are shortened by increasing the width of the extraction electrodes, while decreasing the gaps therebetween. Shortening the current paths reduces magnetic flux generated by the current, which results in less ESL.

Another stacked capacitor disclosed in Japanese patent application publication No. 2001-185441 attempts to reduce ESL by optimizing the ratio of a length L and a width W of the extraction electrodes. In another conventional stacked capacitor disclosed in Japanese unexamined patent application publication No. 2001-284171, ESL is reduced by providing adjacent extraction electrodes with opposite polarities so that magnetic flux generated in adjacent extraction electrodes cancels out each other due to current flowing therethrough.

SUMMARY OF THE INVENTION

However, as the transmission of digital signals has become faster in recent years, digital devices capable of operating at clock frequencies over 1 GHz have emerged. Since the inductance component of the capacitor impedes rapid charging and discharging of the capacitor, the coupling capacitors used for the digital device operating at such high clock frequencies should have a small inductance component in order to keep up with rapid changes and large currents. When the decoupling capacitor is used in the power circuit of a CPU that operates at a frequency of 1 GHz or greater, it is preferable that the ESL is 100 pH or less.

In view of the foregoing, it is an object of the present invention to provide a stacked capacitor for supplying a stable voltage to a CPU or the like while suppressing the ESL to no more than 100 pH.

In order to attain the above object, the present invention provides a stacked capacitor comprising a dielectric element, a plurality of internal electrodes, and a plurality of extraction electrodes. The dielectric element has at least one side surface and a plurality of stacked sheet-like dielectric layers each defining a predetermined surface area. The plurality of internal electrodes alternately stacked with the dielectric layers. Each internal electrode has a conductor falling within the predetermined surface area and has a first edge positioned near the one side surface. The dielectric layers and the internal electrodes define a stacking direction. The plurality of extraction electrodes each extends from each first edge to the one side surface without contact with one another. The plurality of extraction electrodes has a width W at the one side surface in a direction orthogonal to the stacking direction, and a distance G being defined between opposing sides of neighboring extraction electrodes in the direction orthogonal to the stacking direction. The plurality of extraction electrodes has the geometrical relationship of $1.2 \leq W/G \leq 4.0$.

It is preferable that the stacked capacitor has a plurality of external electrodes disposed at the one side surface and extending in the stacking direction. Each external electrodes is in electrical contact with each extraction electrode.

It is preferable that each external electrode has a width substantially equal to the width of the extraction electrode.

It is preferable that the dielectric element, the plurality of internal electrodes and the plurality of external electrodes provides in combination a substantially rectangular parallelepiped shape. The substantially rectangular parallelepiped shape has a longitudinal side coincident with the one side surface, a second side extending substantially perpendicular to the longitudinal side and to the stacking direction, and a third side extending in the stacking direction. A length of the longitudinal side ranges from 1.8 mm to 2.5 mm, a length of the second side ranges from 1.1 mm to 1.3 mm, and a length of the third side ranges from 0.5 mm to 1.3 mm.

BRIEF DESCRIPTION OF THE DRAWINGS

The above and other objects, features, and advantages of the invention will become more apparent from reading the following description of the preferred embodiments taken in connection with the accompanying drawings in which.

DETAILED DESCRIPTION OF THE PREFERRED EMBODIMENTS

Figure 1:
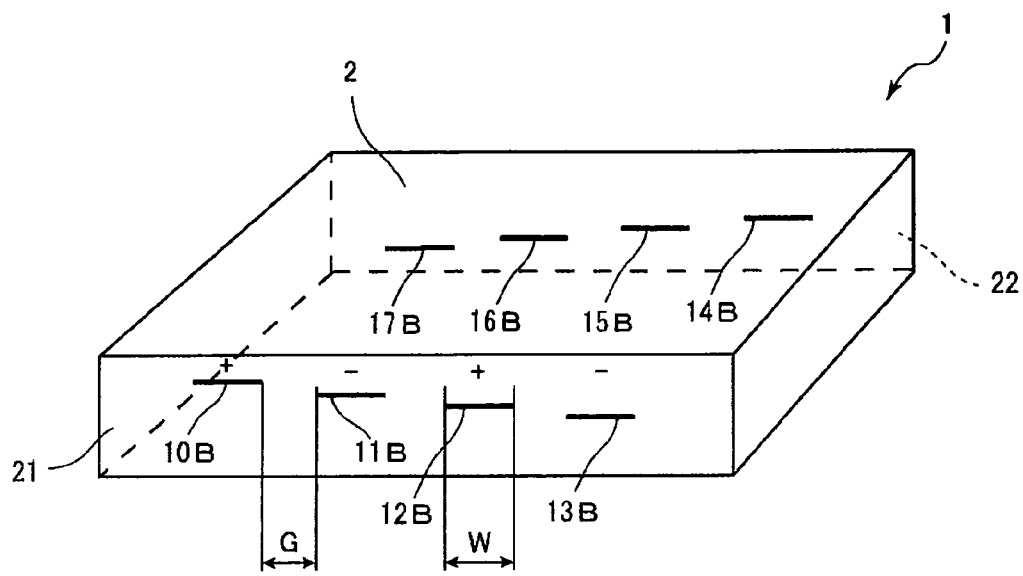
FIG. 1 is a perspective view showing a stacked capacitor according to a preferred embodiment of the present invention.
Figure 2:
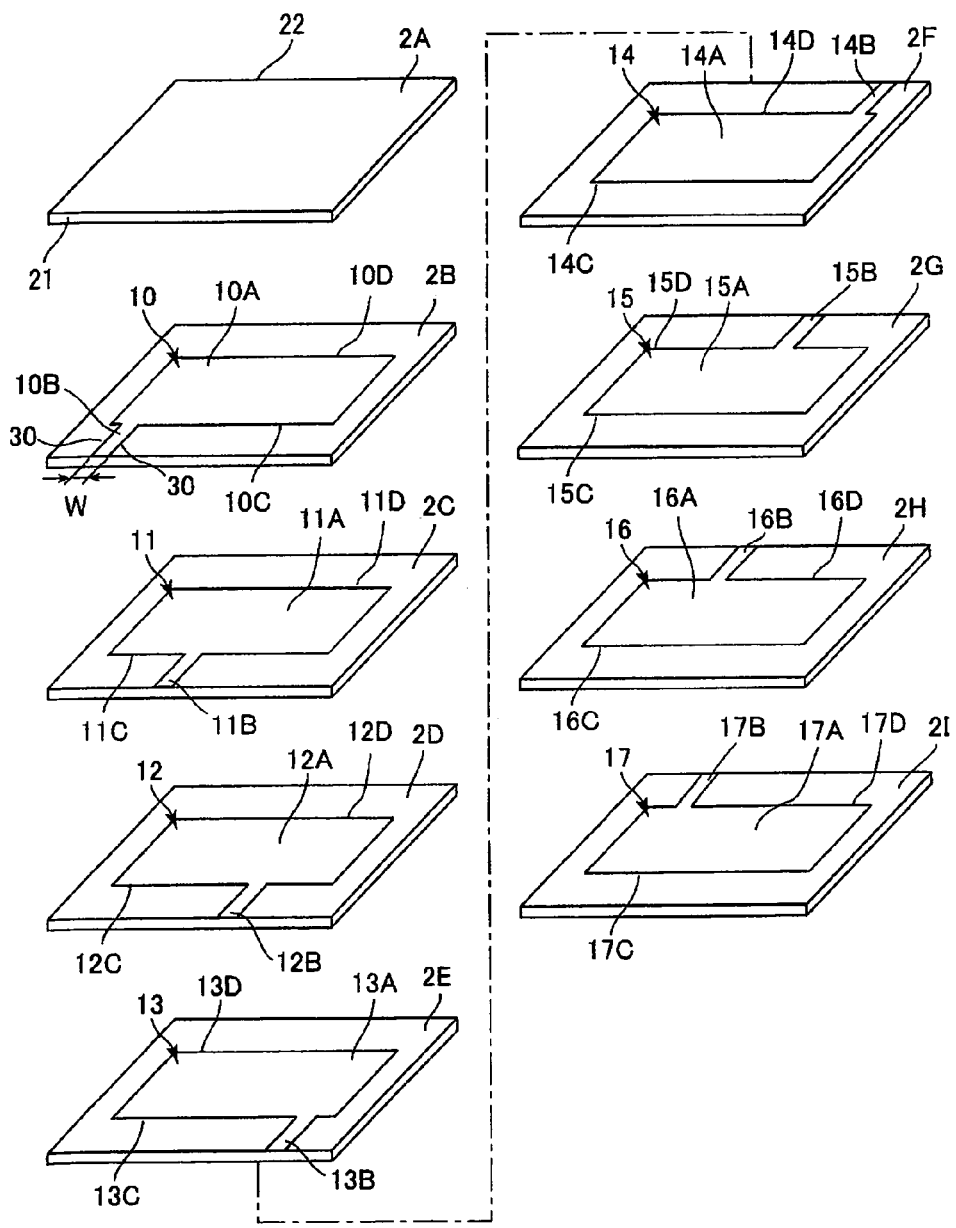
FIG. 2 is an exploded perspective view of the stacked capacitor according to the first embodiment.

A stacked capacitor 1 according to a preferred embodiment of the present invention will be described while referring to FIGS. 1 and 2. As shown in FIGS. 1 and 2, the stacked capacitor 1 includes a dielectric member 2, and first through eighth electrodes 10–17. The dielectric member 2 is constructed by stacking sheet-like dielectric layers 2A–2I that are substantially rectangular in shape. The dielectric member 2 has a first side surface 21 and a second side surface 22 opposing the first side surface 21 (only indicated for the dielectric layer 2A in FIG. 2). The dielectric member 2 is manufactured by stacking ceramic green sheets serving as the dielectric layers 2A–2I and sintering the stacked structure. To use the sintered assembly as a capacitor, external electrodes 40–47 are subsequently formed on the side surfaces of the dielectric member 2 (see FIG. 3).

The first through eighth electrodes 10–17 are formed of a base metal such as nickel or a nickel alloy, copper or a copper alloy, or a metal alloy having one of these metals as the primary component. The first through eighth electrodes 10–17 are disposed on top of each of the dielectric layers 2B–2I, but not on the dielectric layer 2A. In this manner, the dielectric layers 2A–2I and electrodes 10–17 are stacked alternately. Each of the first through eighth electrodes 10–17 is provided one-to-one correspondence with internal electrodes 10A–17A and extraction electrodes 10B–17B. Each of the internal electrodes 10A–17A is substantially similar in shape, and falls within the surface area of the dielectric layers 2A–2I so as to overlap one another substantially in the stacking direction. Each of the internal electrodes 10A–17A is provided one-to-one correspondence with first edges 10C–17C positioned near the first side surface 21, and second edges 10D–17D positioned near the second side surface 22.

The extraction electrodes 10B–13B lead from the first edges 10C–13C to the first side surface 21 of the dielectric member 2 at positions that do not overlap in the stacking direction. The extraction electrodes 14B–17B lead from the second edges 14D–17D to the second side surface 22 of the dielectric member 2 at positions that do not overlap in the stacking direction. The extraction electrodes that are adjacent to one another in the stacking direction are also adjacent to one another on the first side surface 21 in a direction orthogonal to the stacking direction (hereinafter referred to as the "orthogonal direction").

The extraction electrodes 10B–17B are substantially identical in shape and have two edges 30 that determine a width W of the extraction electrodes 10B–17B in the orthogonal direction. Adjacent extraction electrodes among the extraction electrodes 10B–13B are separated by a distance G in the orthogonal direction, while adjacent electrodes among the extraction electrodes 14B–17B are separated by the distance G in the orthogonal direction. The distance G indicates the distance in the orthogonal direction between opposing edges 30 (FIG. 2) of adjacent extraction electrodes. The width W and distance G are set such that 1.2≦W/G≦4.0.

Figure 3:
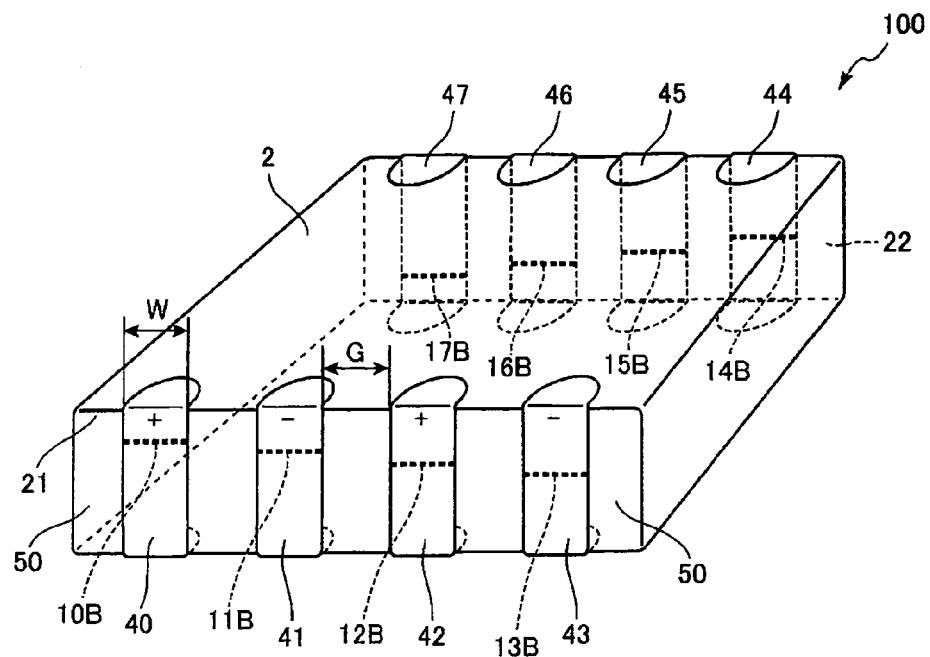
FIG. 3 is a perspective view showing external electrodes formed on the stacked capacitor of the preferred embodiment.

FIG. 3 is a perspective view of a stacked capacitor 100 formed by adding external electrodes to the stacked capacitor 1. As shown in FIG. 3, external electrodes 40, 42, 44, and 46 are formed one-to-one correspondence on the extraction electrode 10B, extraction electrode 12B, extraction electrode 14B, and extraction electrode 16B of the stacked capacitor 1, while external electrodes 41, 43, 45, and 47 are formed one-to-one correspondence on the extraction electrode 11B, extraction electrode 13B, extraction electrode 15B, and extraction electrode 17B. The width of each external electrode in the orthogonal direction is identical to the width W of the extraction electrodes in the orthogonal direction, and the external electrodes are formed so as to entirely cover the respective extraction electrodes. With this construction, the stacked capacitor 100 is used with the external electrodes 40, 42, 44, 46 connected to the power source, and the external electrodes 41, 43, 45, 47 connected to ground.

Next, the reason for setting the distance G and width W such that 1.2≦W/G≦4.0 will be described. Current generates magnetic flux. In this embodiment, since current flows in opposite directions in extraction electrodes that are adjacent to one another in the stacking direction, the magnetic flux are generated in opposite directions in extraction electrodes that are adjacent to one another in the stacking direction. Therefore, the magnetic flux in the extraction electrodes cancels out one another, thereby reducing ESL in the stacked capacitor 1. It is desirable to set the distance G as short as possible to increase magnetic coupling, thereby increasing the amount of cancelled magnetic flux. It is also desirable to set the width W as wide as possible to increase the amount of cancelled magnetic flux.

However, if the distance G is too short, there is a possibility that solder bridges will be formed between adjacent extraction electrodes in mounting the external electrodes on the extracting electrodes, thereby forming short-circuit. Therefore, the inventors of the present invention studied changes in the ESL of the stacked capacitor 1 while varying the ratio W/G within a prescribed range in which such solder bridges are not formed.

Figure 4:
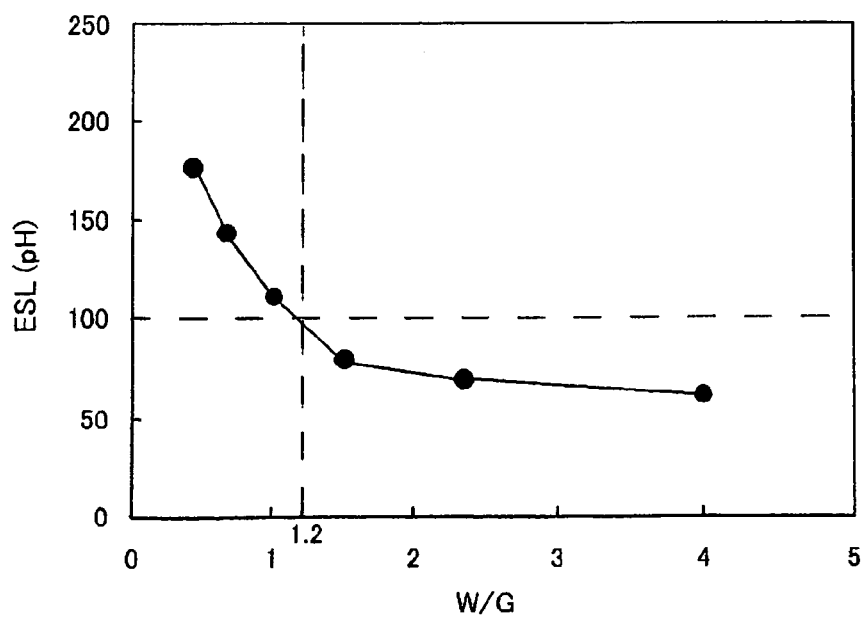
FIG. 4 is a graph of experimental data showing the relationship between the ESL and W/G, where W is the width of extraction electrodes and G the distance separating these electrodes.

FIG. 4 is a graph showing the findings of this study on the changes in ESL. A 2012-size stacked capacitor was used in this study, where 2012 signifies that the product's dimensions are 2.0×1.25×1.25 mm. Since the size of the stacked capacitor is fixed, the sum of the width W and the distance G is a constant value. As described above, if the distance G is too short in the stacked capacitor 100 of FIG. 3, and specifically if the distance G is less than 100 μm, there is an increased possibility that solder bridges will be formed between the external electrodes 40–43 and the external electrodes 44–47 during the mounting process. When the ratio W/G is W/G>4, solder bridges are more likely to be formed. Accordingly, W/G was set to 4.0 or less in the experiment.

Figure 5A:
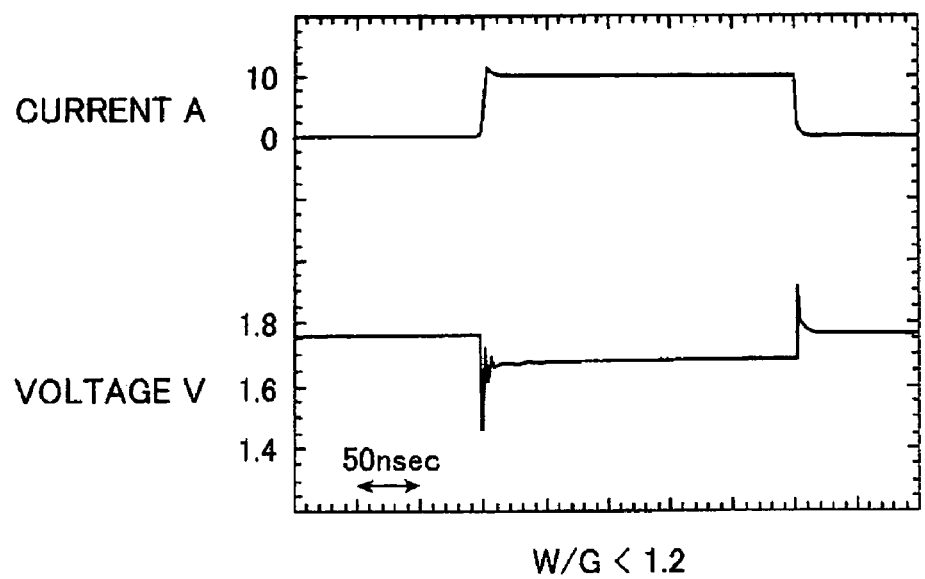
FIG. 5(a) is a graph showing the relationship between a voltage V and a current A when the ratio W/G in the stacked capacitor is less than 1.2 (ESL>100 pH)
Figure 5B:
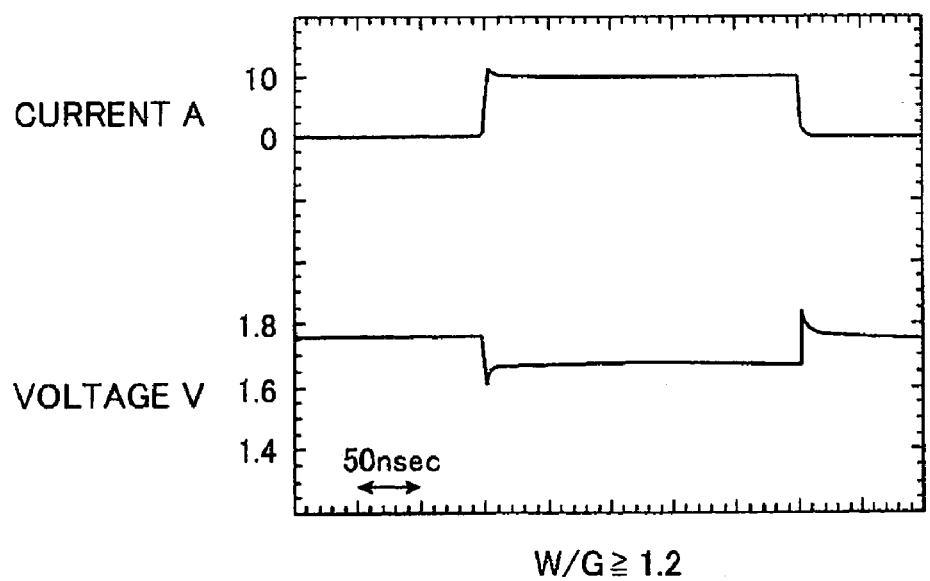
FIG. 5(b) is a graph showing the relationship between a voltage V and a current A when the ratio W/G in the stacked capacitor is greater than or equal to 1.2 (ESL≦100 pH)

On the other hand, when W/G is less than 1.2, the ESL becomes greater than 100 pH. FIG. 5(a) shows the relationship of a voltage V and a current A supplied to a digital device operating at a low voltage and a frequency of 1 GHz or greater when the ratio W/G is less than 1.2 (ESL>100 pH). FIG. 5(b) shows the relationship of a voltage V and a current A supplied to a digital device operating at a low voltage and a frequency of 1 GHz or greater when the ratio W/G is 1.2 or greater (ESL≦100 pH). As shown in the drawings, when the W/G is less than 1.2, that is, when the ESL is greater than 100 pH, changes in the voltage V accompanying changes in the current A are greater than when the W/G is 1.2 or greater. Therefore, the ratio W/G was set to at least 1.2 in order to restrain voltage changes.

Based on these findings, setting the width W and distance G such that $1.2 \leq W/G \leq 4.0$ can suppress the ESL to 100 pH or less, while preventing short-circuit caused by solder in a 2012-size stacked capacitor. Accordingly, this construction can regulate changes in voltage supplied to the CPU.

Figure 6:
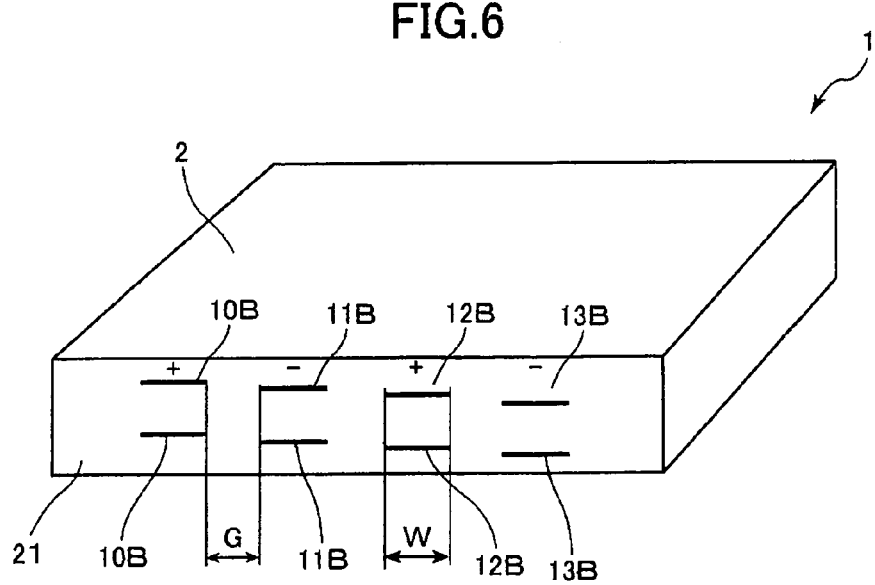
FIG. 6 is a perspective view of the stacked capacitor according to a first modification of the preferred embodiment, wherein the number of layers has been increased.
Figure 7:
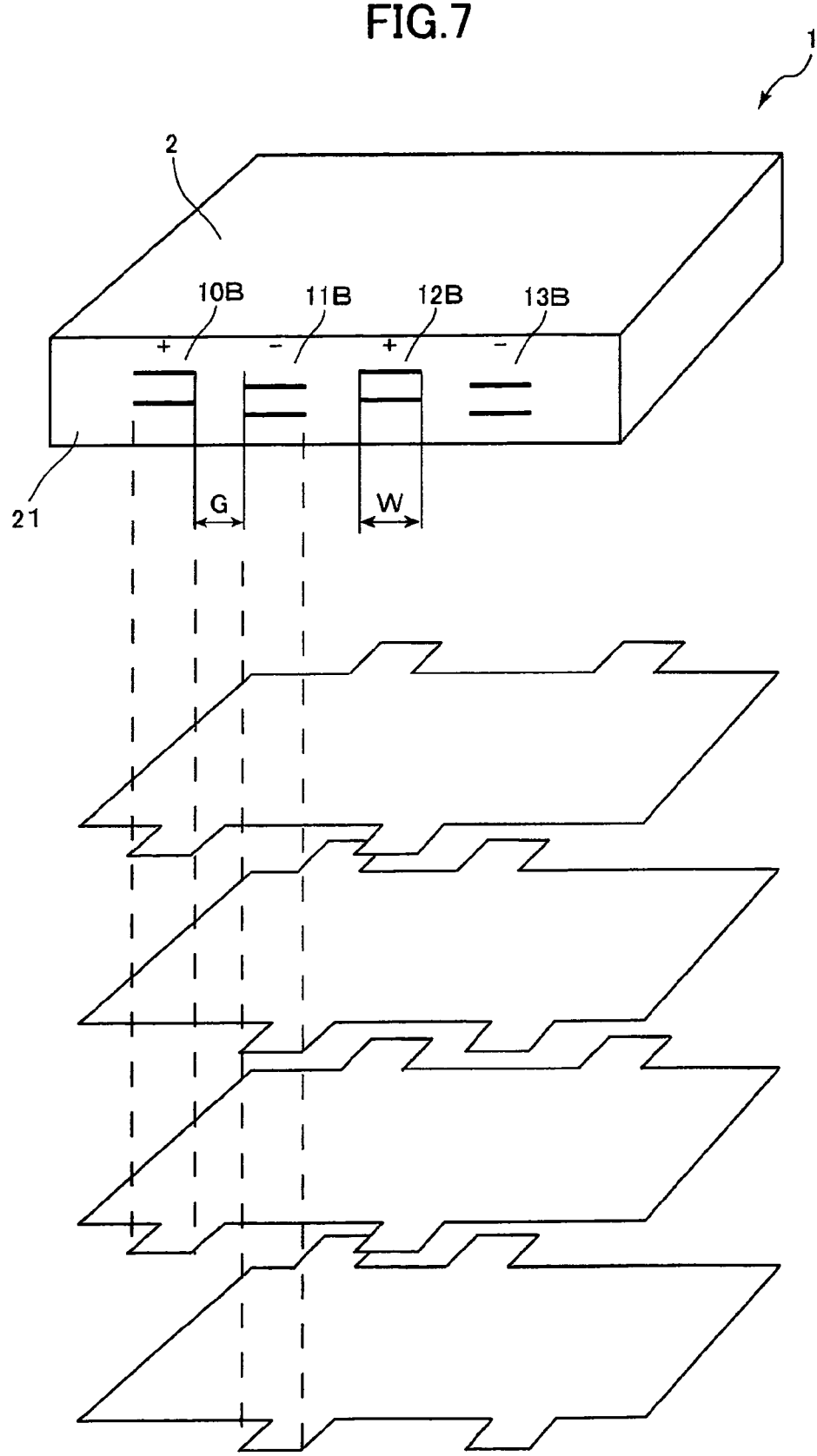
FIG. 7 is a explanation view of the stacked capacitor according to, a second modification of the preferred embodiment, wherein a plurality of extraction electrodes leads out from a single internal electrode.

A first modification is shown in FIG. 6, where another set of the dielectric layers 2B–2I shown in FIG. 2 is added to the original stack. Further, a second modification is shown in FIG. 7, where upper half is a perspective view of the stacked capacitor and lower half is an exploded perspective view of the stacked capacitor. In the second modification, a plurality of extraction electrodes are led from a single internal electrode. In this case, the extraction electrodes led from the same internal electrode will have the same polarity.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A stacked capacitor comprising:
   a dielectric element having at least one side surface and comprising a plurality of stacked sheet-like dielectric layers each defining a predetermined surface area;
   a plurality of internal electrodes alternately stacked with the dielectric layers, each internal electrode comprising a conductor falling within the predetermined surface area and having a first edge positioned near the one side surface, the dielectric layers and the internal electrodes defining a stacking direction;
   a plurality of extraction electrodes each extending from each first edge to the one side surface without contact with one another, and having a width W at the one side surface in a direction orthogonal to the stacking direction, a distance G being defined between opposing sides of neighboring extraction electrodes in the direction orthogonal to the stacking direction;
   wherein the plurality of extraction electrodes has the geometrical relationship of $1.2 \leq W/G \leq 4.0$.

2. The stacked capacitor as claimed in claim 1, further comprising a plurality of external electrodes disposed at the one side surface and extending in the stacking direction, each external electrodes being in electrical contact with each extraction electrode.

3. The stacked capacitor as claimed in claim 2, wherein each external electrode has a width substantially equal to the width of the extraction electrode.

4. The stacked capacitor as claimed in claim 2, wherein the dielectric element, the plurality of internal electrodes and the plurality of external electrodes provides in combination a substantially rectangular parallelepiped shape having a longitudinal side coincident with the one side surface, a second side extending substantially perpendicular to the longitudinal side and to the stacking direction, and a third side extending in the stacking direction, a length of the longitudinal side ranging from 1.8 mm to 2.5 mm, a length of the second side ranging from 1.1 mm to 1.3 mm, and a length of the third side ranging from 0.5 mm to 1.3 mm.

* * * * *